United States Patent

Swift, Sr. et al.

[11] Patent Number: 5,904,106
[45] Date of Patent: May 18, 1999

[54] SEEDLING TRANSFER TOOL

[76] Inventors: John E. Swift, Sr.; Lucy Swift, both of 2031 Wetternhorn Dr., Bel Air, Md. 21015

[21] Appl. No.: 09/124,735

[22] Filed: Jul. 30, 1998

[51] Int. Cl.⁶ .................................................. A01C 11/02
[52] U.S. Cl. ................................................. 111/106; D8/4
[58] Field of Search ............................. 111/106; 294/8.5; D8/4; D7/687

[56] References Cited

U.S. PATENT DOCUMENTS

| | | | |
|---|---|---|---|
| 90,319 | 5/1869 | Somers .......................................... D8/4 |
| 185,602 | 12/1876 | Walter ...................................... 111/106 |
| D. 187,429 | 3/1960 | Bredenberg ................................. D8/4 |
| D. 258,110 | 2/1981 | Lamberth ............................. D7/686 X |
| D. 260,655 | 9/1981 | Guay ..................................... D7/686 X |
| 289,185 | 11/1883 | Visscher .................................. 111/106 |
| D. 298,600 | 11/1988 | Dallaire ............................... D7/686 X |
| D. 357,846 | 5/1995 | McNaughton ............................. D7/686 |
| 388,321 | 8/1888 | Tobey ..................................... 111/106 |
| 874,547 | 12/1907 | Shaw ........................................ 294/4.5 |
| 938,651 | 11/1909 | Doughty .............................. 111/106 X |
| 974,077 | 10/1910 | Kleeberger ............................... 111/106 |
| 1,053,730 | 2/1913 | Jensen ..................................... 111/106 |
| 1,823,789 | 9/1931 | Dohrn ..................................... 111/106 |
| 2,237,861 | 4/1941 | Briggs ...................................... D8/4 X |
| 2,422,929 | 6/1947 | Roller ...................................... D8/4 X |
| 3,210,112 | 10/1965 | Glynn . |
| 3,594,931 | 7/1971 | Yost . |
| 3,596,966 | 8/1971 | Shredl . |
| 3,865,055 | 2/1975 | Gilbaugh . |
| 3,957,298 | 5/1976 | Purchase .............................. D7/686 X |
| 4,728,139 | 3/1988 | Oretti ....................................... D7/686 |
| 5,040,471 | 8/1991 | Lamont, Jr. . |
| 5,398,624 | 3/1995 | Caron ..................................... 111/106 |

FOREIGN PATENT DOCUMENTS

| | | | |
|---|---|---|---|
| 144923 | 4/1954 | Sweden ................................. 111/106 |
| 10504 | 1/1909 | United Kingdom ................. 111/106 |
| 113872 | 3/1918 | United Kingdom ................. 111/106 |
| 185172 | 8/1922 | United Kingdom ................. 111/106 |

*Primary Examiner*—Christopher J. Novosad

[57] ABSTRACT

A seedling transfer tool including a flexible inverted U-shaped blade assembly in an essentially inverted U-shaped configuration with two generally parallel fingers. Each finger has a U-shaped lower end terminating in a point and facing arcuate recesses at its upper end. A central section is provided having a generally semi-circular cross-section between its upper and lower ends. The blade assembly also has a downwardly facing U-shaped intermediate section which couples the fingers with a central aperture therethrough. The axis of the intermediate section is at a right angle from the axes of the central sections of the fingers. A screw extends through the apertures of the blade assembly and cylinder coupling the blade assembly and cylinder.

7 Claims, 2 Drawing Sheets

SEEDLING TRANSFER TOOL

BACKGROUND OF THE INVENTION

1. Field of the Invention

The present invention relates to a seedling transfer tools and more particularly pertains to handling seedlings in a tender and convenient manner.

2. Description of the Prior Art

The use of apparatus for handling seedlings of various designs and configurations is known in the prior art. More specifically, apparatus for handling seedlings of various designs and configurations heretofore devised and utilized for the purpose of transporting seedlings through various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,040,471 to Lamont, Jr. discloses a Hand Vegetable Transplanter With Assembly for Varying Quantity of Liquid Dispensed. U.S. Pat. No. 3,865,055 to Gilbaugh discloses a Plant Transplanter. U.S. Pat. No. 3,210,112 to Glynn discloses a Garden Tool. U.S. Pat. No. 3,596,966 to Shredl discloses a Weeder. U.S. Pat. No. 3,594,931 to Yost discloses an Apparatus for Excavating Plants. Lastly, U.S. Pat. No. 5,398,624 to Caron discloses a Transplanting Tool.

In this respect, the seedling transfer tools according to the present invention substantially departs from the conventional concepts and designs of the prior art, and in doing so provides an apparatus primarily developed for the purpose of handling seedlings in a tender and convenient manner.

Therefore, it can be appreciated that there exists a continuing need for a new and improved seed transporting system which can be used for handling seedlings in a tender and convenient manner. In this regard, the present invention substantially fulfills this need.

SUMMARY OF THE INVENTION

In view of the foregoing disadvantages inherent in the known types of apparatus for handling seedlings of various designs and configurations now present in the prior art, the present invention provides an improved seedlings transporting system. As such, the general purpose of the present invention, which will be described subsequently in greater detail, is to provide a new and improved seedlings transporting system and method which has all the advantages of the prior art and none of the disadvantages.

To attain this, the present invention essentially comprises a new and improved seedling transfer tool for handling seedlings in a tender and convenient manner. The system comprises a flexible inverted U-shaped blade assembly in an essentially inverted U-shaped configuration with two generally parallel fingers. Each finger has a U-shaped lower end terminating in a point and facing arcuate recesses at its upper end and with a central section having a generally semi-circular cross-section between its upper and lower ends. The blade also has a downwardly facing U-shaped intermediate section coupling the fingers with a central aperture therethrough. The axis of the intermediate section is at a right angle from the axes of the central sections of the fingers. The blade assembly is fabricated of a resilient material selected from the class of resilient materials including 23-gauge galvanized sheet steel, tin plate steel, aluminum and plastic. A cylinder is fabricated of wood having a length less than the length of the blade assembly and a radius of curvature essentially equal to the radius of curvature of the intermediate section with a central aperture therethrough aligned with the aperture of the blade assembly. A screw extends through the apertures of the blade assembly and cylinder coupling the blade assembly and cylinder.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved seedling transport tool which has all of the advantages of the prior art apparatus for handling seedlings of various designs and configurations and none of the disadvantages.

It is another object of the present invention to provide a new and improved seedling transfer tool which may be easily and efficiently manufactured and marketed.

It is further object of the present invention to provide a new and improved seedling transfer tool which is of durable and reliable constructions.

An even further object of the present invention is to provide a new and improved seedling transfer tool which is susceptible of a low cost of manufacture with regard to both materials and labor, and which accordingly is then susceptible of low prices of sale to the consuming public, thereby making such seedlings transporting system economically available to the buying public.

Even still another object of the present invention is to provide a seedling transfer tool for handling seedlings in a tender and convenient manner.

Lastly, it is an object of the present invention to provide a new and improved seedling transfer tool including a flexible inverted U-shaped blade assembly in an essentially inverted U-shaped configuration with two generally parallel fingers. Each finger has a U-shaped lower end terminating in a point and facing arcuate recesses at its upper end. A central section is provided having a generally semi-circular cross-section between its upper and lower ends. The blade assembly also has a downwardly facing U-shaped intermediate section which couples the fingers with a central aperture therethrough. The axis of the intermediate section is at a right angle from the axes of the central sections of the fingers. A screw extends through the apertures of the blade assembly and cylinder coupling the blade assembly and cylinder.

These together with other objects of the invention, along with the various features of novelty which characterize the invention, are pointed out with particularity in the claims annexed to and forming a part of this disclosure. For a better understanding f the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
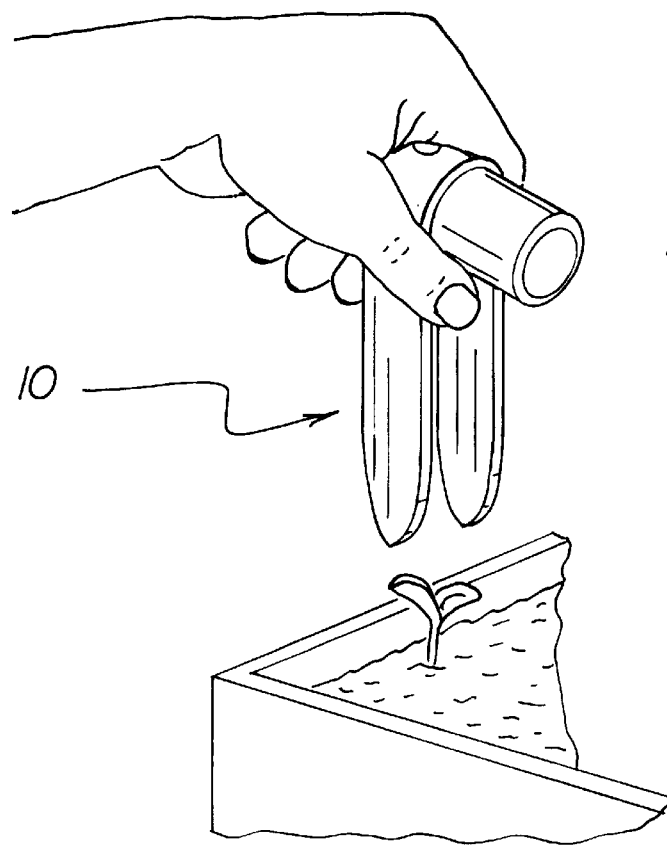
FIG. 1 is a perspective view of the preferred embodiment of the seedling transport tool constructed in accordance with the principles of the present invention.
Figure 2:
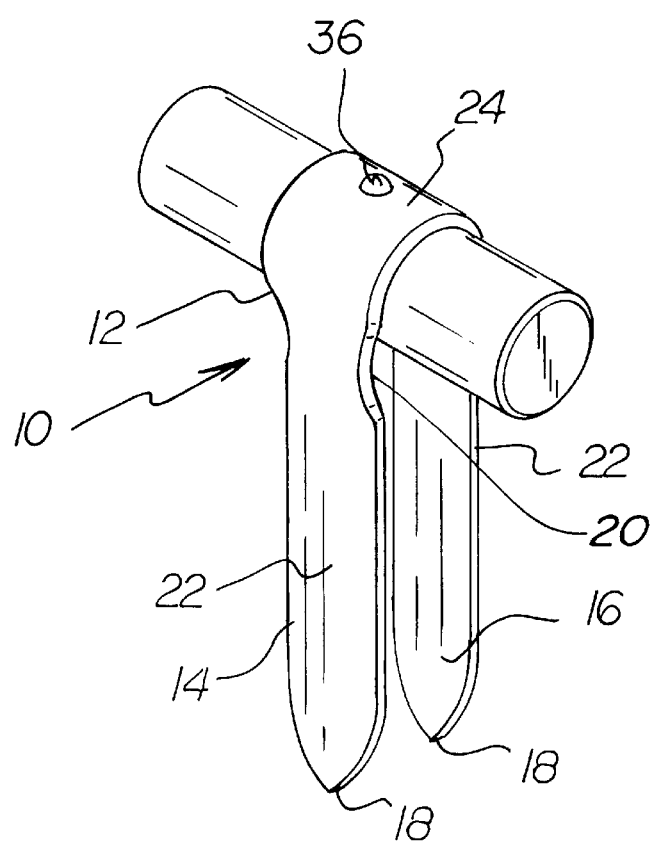
FIG. 2 is a view similar to FIG. 1 but with the seedling in hand of a user removed.
Figure 3:
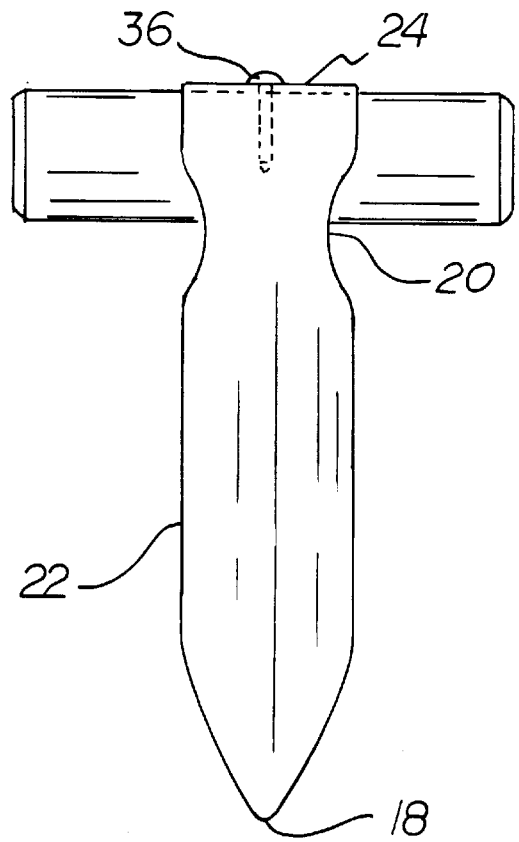
FIG. 3 is a side elevational view of the apparatus shown in the prior Figure.

With reference now to the drawings, and in particular to FIG. 1 thereof, the preferred embodiment of the new and improved seedling transport tool embodying the principles and concepts of the present invention and generally designated by the reference numeral 10 will be described.

The present invention, the seedling transfer tool 10 is comprised of a plurality of components. Such components are individually configured and correlated with respect to each other so as to attain the desired objective.

The tool 10 of the present invention comprises new and improved seedling transfer tool for handling seedlings in a tender and convenient manner.

Figure 4:
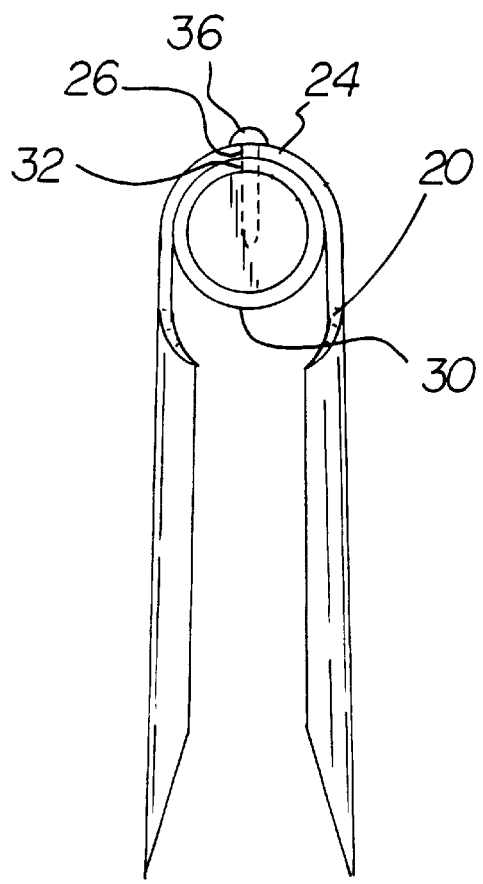
FIG. 4 is an end elevational view of the system shown in FIG. 3.

More specifically, the tool 10 of the invention comprises a flexible inverted U-shaped blade assembly 12 in an essentially inverted U-shaped configuration with two generally parallel fingers 14, 16. Each finger has a U-shaped lower end terminating in a point 18 and facing arcuate recesses 20 at its upper end. A central section 22 of each finger has a generally semi-circular cross-section between its upper and lower ends. As shown in FIG. 4, the lower ends of the fingers have a tapering thickness. The blade assembly also has a downwardly facing U-shaped intermediate section 24 coupling the fingers with a central aperture 26 therethrough. The axis of the intermediate section is at a right angle from the axes of the central sections of the fingers. The blade assembly is fabricated of a resilient material selected from the class of resilient materials including 23-gauge galvanized sheet steel, tin plate steel, aluminum and plastic.

Also provided is a cylinder 30 fabricated of wood or other type of material having a length less than the length of the blade assembly. The cylinder also has a radius of curvature essentially equal to the radius of curvature of the intermediate section. A central aperture 32 is formed in the cylinder at a central extent thereof and in perpendicular relationship with an axis of the cylinder. In use, the central aperture is aligned with the aperture of the blade assembly. Lastly provided is a screw 36 which extends through the apertures of the blade assembly and cylinder, thereby coupling the blade assembly and cylinder.

As described hereinabove, the tool of the present invention is a compact, easy-to-use tool that allows a gardener to easily, cleanly, and safely transplant a seedling into a tray or pot. This tool, features a T-shaped design and contains a cylindrical handle, constructed from wood and measuring approximately 3 inches long. Attached perpendicularly to the center of the handle on each side of it are matching 4¾ inch long steel blades. These blades, are slightly rounded or beveled towards the center of the tool and measure approximately ¼ inch wide and contain honed tips.

Ideally, a gardener would place the tool over a seedling and guide the blades into the ground around the plant. The user then lifts up the tool, while slightly applying pressure to the blades, thus removing the seedling and a small amount of soil around the plant, which serves to protect the roots and stem. The gardener then safely inserts the seedling and soil into a tray or pot. Finally, the gardener releases the pressure on the tool, removes it from the tray or pot, and adds additional soil, as desired.

The appealing features of the present apparatus are its practicality, durability, convenience, versatility, and ease of use. The apparatus allows a gardener to transplant a seedling in a much safer manner and with less mess and soiling normally associated with conventional methods of transplanting. It reduces damage to plant roots caused by attempting to remove the seedling by hand or digging around the plant with a small shovel. The tool is lightweight, relatively inexpensive and reusable. It is available in a variety of sizes and shapes to accommodate various sizes of seedlings.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A seedling transfer tool for handling seedlings comprising, in combination:

a flexible inverted U-shaped blade assembly in an essentially inverted U-shaped configuration with two generally parallel fingers, each finger having a U-shaped lower end terminating in a point and facing semi-circular recesses formed in opposing side edges at its upper end and with a central section having a generally semi-circular cross-section between its upper and lower ends, wherein the lower ends of the fingers have a tapering thickness, the blade assembly also having a downwardly facing U-shaped intermediate section coupling the fingers with a central aperture therethrough, an axis of the intermediate section being at a right angle from axes of the central sections of the fingers, the blade assembly being fabricated of a resilient material selected from the class of resilient materials including 23-gauge galvanized sheet steel, tin plate steel, aluminum and plastic;

a cylinder fabricated of wood having a length less than a length of the blade assembly and a radius of curvature essentially equal to a radius of curvature of the intermediate section with a central aperture formed partially therethrough and aligned with the aperture of the blade assembly; and a screw extending through the apertures of the blade assembly and cylinder thereby coupling the blade assembly and the cylinder, wherein tops of the semi-circular recesses remain coincident with the cylinder.

2. The tool as claimed in claim 1 wherein the blade assembly is fabricated of 23-gauge galvanized sheet steel.

3. The tool as claimed in claim 1 wherein the blade assembly is fabricated of tin plate steel.

4. The tool as claimed in claim 1 wherein the blade assembly is fabricated of aluminum.

5. The tool as claimed in claim 1 wherein the blade assembly is fabricated of plastic.

6. The tool as claimed in claim 1 wherein the fingers of the blade assembly have a length of 4¾ inches and the cylinder has a length of 3 inches, wherein the fingers are ¼ inch in width.

7. A seedling transfer tool for handling seedlings comprising, in combination:

a flexible inverted U-shaped blade assembly in an essentially inverted U-shaped configuration with two generally parallel fingers, each finger having a U-shaped lower end terminating in a point and facing semi-circular recesses formed in opposing side edges at its upper end and with a central section having a generally semi-circular cross-section between its upper and lower ends, wherein the lower ends of the fingers have a tapering thickness, the blade assembly also having a downwardly facing U-shaped intermediate section coupling the fingers, an axis of the intermediate section being at a right angle from axes of the central sections of the fingers, the blade assembly being fabricated of a resilient material selected from the class of resilient materials including 23-gauge galvanized sheet steel, tin plate steel, aluminum and plastic; and a cylinder having a length less than a length of the blade assembly and a radius of curvature essentially equal to a radius of curvature of the intermediate section and coupled thereto in perpendicular relationship therewith, wherein tops of the semi-circular recesses remain coincident with the cylinder.

\* \* \* \* \*